United States Patent Office 3,043,870
Patented July 10, 1962

3,043,870
SEPARATION OF ISOPHTHALIC ACID FROM TEREPHTHALIC ACID
Stanford J. Hetzel, Newtown Square, Pa., assignor to Sun Oil Company, Philadelphia, Pa., a corporation of New Jersey
No Drawing. Filed Oct. 17, 1958, Ser. No. 767,774
4 Claims. (Cl. 260—525)

This invention relates to the separation of an isophthalic compound from a terephthalic compound, and more particularly to the use of a solvent having multiple components to effect such separation.

In known processes for the partial oxidation of mixtures of meta-xylene and para-xylene, a product comprising isophthalic acid and terephthalic acid is obtained, and it is frequently desirable to separate the respective acids in a concentrated form from the oxidation products. It has been proposed in the art to separate isophthalic acid from such products by selectively dissolving that acid in a liquid solvent. In such solvent separations, highly important characteristics of the operation are (1) the capacity of the solvent for dissolving isophthalic acid and (2) the selectivity of the solvent, as expressed by the ratio of the solubilities of isophthalic acid and terephthalic acid respectively in the solvent. Solvents which have been employed previously have, for the most part, not been completely satisfactory in both of these respects. The present invention, however, provides a solvent containing multiple components which has generally superior characteristics with respect to solvent capacity and selectivity, the components exhibiting a synergistic effect when employed together.

The solvent employed according to the invention is a mixture of an aliphatic alcohol and an alkyl aryl ketone. Preferably, the mixture contains 10 to 90 weight percent, more preferably 25 to 75 weight percent, of the alcohol based on the mixture. The solvent may also contain a minor amount of water, although this is not essential and a substantially anhydrous solvent can be employed with good effect. This water component, if present, should not exceed the maximum amount which produces a single phase mixture of the water, alcohol and ketone. This will depend on the relative amounts of alcohol and ketone, and on other factors, and can readily be determined by a person skilled in the art. In separating free isophthalic acid from free terephthalic acid, the amount of water preferably does not exceed 15 weight percent of the alcohol component, since greater amounts tend to excessively reduce the capacity of the solvent for dissolving isophthalic acid. In separating alkali metal or ammonium derivatives of the acids, greater amounts of water, e.g. up to 50% or more of the alcohol component can be present while still obtaining good selectivity and capacity for the isophthalic derivative.

The alcohol component of the solvent mixture is an alkanol which contains 1 to 10 carbon atoms per molecule and preferably does not contain more than three carbon atoms per molecule. Examples of suitable alcohols include methanol, ethanol, isopropanol, n-butyl alcohol, 2-ethyl hexyl alcohol, etc. The lower alcohols are preferred because they exhibit generally higher solvent capacity and selectivity for isophthalic acid.

The ketone component of the solvent mixture preferably does not contain more than 12 carbon atoms per molecule. Examples of suitable ketones include acetophenone, methyl tolyl ketone, phenyl isopropyl ketone, etc.

The amount of total solvent employed according to the invention is sufficient to dissolve isophthalic acid in the feed mixture and leave terephthalic acid in the feed mixture, undissolved, and is preferably within the approximate range from 5 to 30 parts by weight per part of the mixture of isophthalic acid and terephthalic acid which is separated according to the invention, more preferably within the approximate range from 10 to 20 parts per part of phthalic acid mixture.

The temperature employed in the separation is preferably within the approximate range from room temperature to 300° F. and more preferably within the approximate range from 125° F. to 250° F. Usually it will be desired to conduct the separation at atmospheric pressure unless elevated pressure is required to maintain the alcohol in liquid phase at the temperature employed.

In one embodiment of the invention, the ketone component of the solvent is obtained by partial oxidation of ethyl benzene in liquid phase, such oxidation being a known reaction. Such oxidation may occur simultaneously with the oxidation of the meta-xylene and para-xylene to the corresponding phthalic acids, since the charge stocks for the latter oxidations frequently contain ethyl benzene which is oxidized to acetophenone under the same conditions which cause oxidation of the xylenes to the corresponding phthalic acids. Upon filtration of the phthalic acids from the liquid products of oxidation, the latter can be distilled to remove overhead, first unreacted xylene, then acetophenone, and subsequently toluic acid intermediate oxidation product if desired. The xylene and toluic acid can then be recycled to the oxidation zone and the acetophenone employed together with added alcohol to contact the filter cake and selectively dissolve the isophthalic acid therein. Prior to such contacting, occluded xylene can be vaporized from the filter cake. Alternatively, the xylene can be present during the separation and be removed from the phthalic acid products following the separation.

The process according to the invention involves contacting a mixture of isophthalic acid and terephthalic acid, or subsequently specified derivatives of such acids, with the solvent referred to above. The mixture of isopthalic acid and terephthalic acid (reference to the acid hereafter being understood to apply also to the specified derivatives) may contain for example 10 to 90 weight percent of isophthalic acid based on the acid mixture; more frequently the mixture contains 25 to 75 weight percent of isophthalic acid. A liquid solvent phase containing a dissolved isophthalic acid concentrate is obtained in the contacting. The terephthalic acid concentrate remains undissolved and is separated from the liquid phase by any suitable means such as filtration. Isophthalic acid is recovered from the filtrate by any suitable means. For example, alcohol can be distilled from the filtrate, and subsequently if desired a portion of the ketone can be distilled therefrom. The removal of solvent results in precipitation of solid isophthalic acid from the solution. The isophthalic acid can then be removed from the liquid phase by suitable means such as filtration, the filter cake preferably being washed with an alcohol to remove ketone therefrom. The alcohol and ketone distillates obtained in such operation and also the washings from the filter cakes can be reused to contact additional mixture of isophthalic acid and terephthalic acid.

The process according to the invention can be applied to mixtures of isophthalic acid and terephthalic acid in the free acid form or alternatively to such mixtures in the form of their ammonium or alkali metal, e.g. sodium, potassium, etc. salts. In the latter embodiments, the operation is generally similar to that described previously, and the free acids can be recovered if desired by acidification of the respective concentrates.

The following examples illustrate the invention.

*Example I*

The solubility of isophthalic acid and terephthalic acid in methanol, acetophenone and equal volume mixtures of the two have been determined and found to be the following. The solubilities given are those at 85° F., with the exception of that given for isophthalic acid in acetophenone which was obtained at 94° F.

| Solvent | Isophthalic Acid | Terephthalic Acid |
|---|---|---|
| Methanol | 0.0173 | 0.00129 |
| Acetophenone | 0.0011 | 0.00016 |
| Methanol-Acetophenone | 0.0245 | 0.0016 |

The solubilities given in the above table are expressed in grams of the acid dissolved in one cc. of the solvent.

This example shows that the mixture of methanol and acetophenone has substantially greater solvent capacity for isophthalic acid than either of the individual components and also has substantially greater ratio of isophthalic acid solubility to terephthalic acid solubility than either of the individual components. Thus, a synergistic effect is obtained in the use of the components in admixture.

Generally similar results are obtained employing mixtures containing other alcohols and other ketones such as those specifically disclosed previously.

*Example II*

A mixture of about 60 parts by weight of isophthalic acid and 40 parts by weight of terephthalic acid is contacted with a mixture of methanol and acetophenone in equal volumes. The temperature of the contacting is about 150° F., and the amount of solvent employed is about 15 parts by weight per part of mixed phthalic acids. Terephthalic acid concentrate containing more than 95% terephthalic acid is filtered from a solution of isophthalic acid concentrate containing more than 95% isophthalic acid in the mixed solvent. The isophthalic acid concentrate is recovered from the solution according to the procedure described previously.

This example shows that a highly satisfactory separation of isophthalic acid from terephthalic acid is obtainable according to the invention. The results obtained in such separation are superior to those obtained using either of the individual components as selective solvent.

Generally similar results are obtained employing mixtures of phthalic acid derivatives such as those specifically disclosed previously, and also when employing other alcohols and ketones such as those specifically disclosed previously.

The invention claimed is:
1. Process for separating isophthalic acid from terephthalic acid which comprises:
 (1) contacting a mixture of isophthalic acid and terephthalic acid with a solvent mixture containing 10 to 90 wt. percent of an alkanol having 1 to 10 carbon atoms per molecule, and the remainder an alkyl aryl ketone having up to 12 carbon atoms per molecule, thereby to form a mixture of solid terephthalic acid with a solution of isophthalic acid in said solvent mixture,
 (a) the temperature of said contacting being in the range from room temperature to 300° F., and
 (b) the amount of said solvent mixture being sufficient to dissolve isophthalic acid and leave terephthalic acid undissolved; and
 (2) separating said solid terephthalic acid from said solution.
2. Process according to claim 1 wherein said alkanol contains 1 to 3 carbon atoms per molecule.
3. Process according to claim 1 wherein said ketone is acetophenone.
4. Process according to claim 1 wherein said amount of solvent mixture is in the range from 5 to 30 parts per part of said mixture of isophthalic acid and terephthalic acid.

References Cited in the file of this patent
UNITED STATES PATENTS

| 2,732,399 | Carlston et al. | Jan. 24, 1956 |
| 2,741,633 | McKinnis et al. | Apr. 10, 1956 |
| 2,840,604 | Feighner et al. | June 24, 1958 |
| 2,857,429 | Bruson et al. | Oct. 21, 1958 |

FOREIGN PATENTS

| 635,088 | Great Britain | Apr. 5, 1950 |